United States Patent Office 2,780,128
Patented Feb. 5, 1957

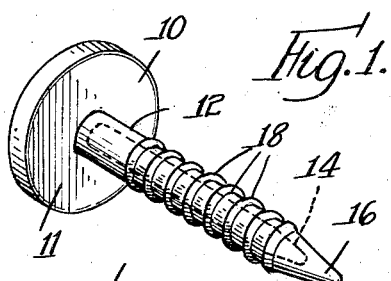
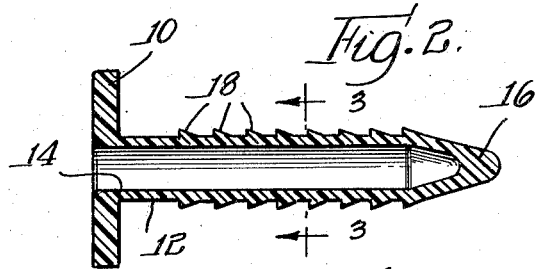
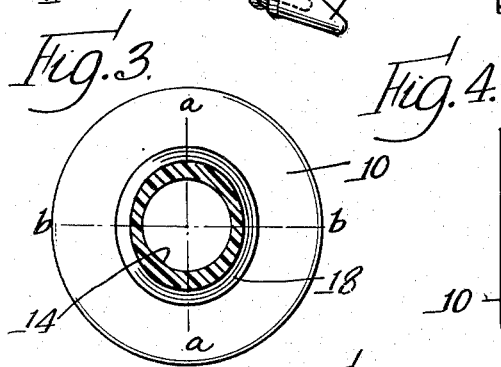
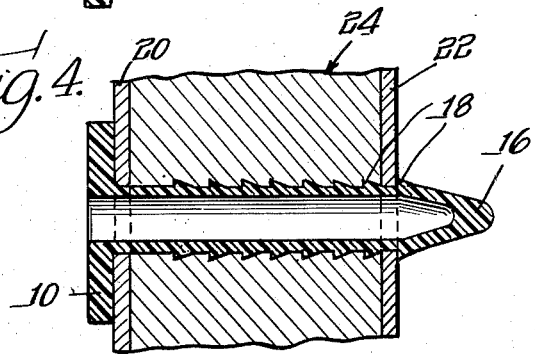
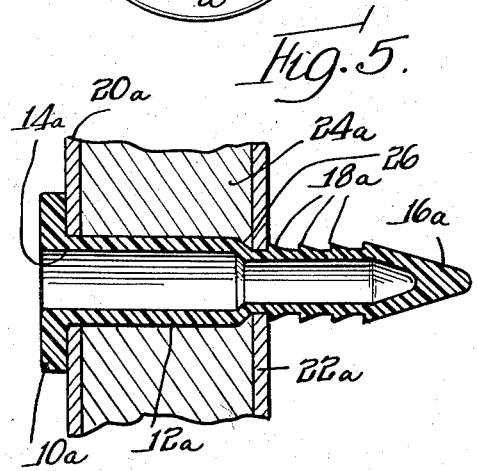
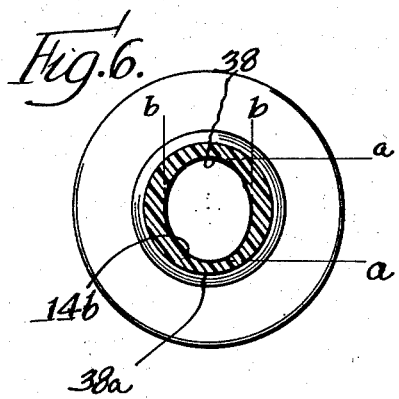

2,780,128

DRIVEN PLASTIC SEALING FASTENER HAVING SHOULDER MEANS THEREON

George M. Rapata, Chicago, Ill., assignor to Illinois Tool Works, Chicago, Ill., a corporation of Illinois Application October 29, 1956, Serial No. 618,878

7 Claims. (Cl. 85—5)

The present invention relates to new and useful improvements in fastening devices and more particularly to such improvements in drive fasteners of the type adapted to retain together a plurality of apertured workpieces, and is a continuation-in-part of my application Serial No. 427,829, filed May 5, 1954.

There are numerous installations in which there are a pair of spaced panels to be held in their relatively fixed and spaced positions as, for instance, in fire wall structures of automobiles and the like where there are a pair of spaced panels with a layer of fibrous insulating material, such as jute or fiberglass, therebetween. It has been customary in structures of this type to employ a plurality of metal fasteners passed through aligned openings in the panels for securing the same together. Such metal fasteners have been relatively difficult and expensive to manufacture and they are also subject to corrosion. Another disadvantage in the use of such metal fasteners is that they did not effectively seal the apertures in the panels so that fumes and the like often passed from the engine compartment into the passenger compartment.

Plastic fastener elements are now being extensively used in installations of the type referred to above. These plastic fastener elements may be of one piece construction and have the advantage of sealing the apertures in the panels which are held together thereby. Another advantage of such plastic fastener elements is that they may be relatively easily and inexpensively manufactured.

It is an object of the present invention to provide an improved one piece plastic fastener for securing together a plurality of apertured workpieces or panels.

Another object of the invention is to provide such a one piece plastic fastener element which is constructed and arranged so as to facilitate its insertion through the apertured workpieces or panels while at the same time effectively securing together the panels and sealing the apertures therethrough.

Another object of the present invention is to provide a one piece plastic fastener element having a shank which is out-of-round to provide major and minor axes and also apertured or recessed to facilitate resilient collapsing of the surfaces along the major axis during insertion of the fastener element.

A further object of this invention is to provide a fastener element substantially of the above type wherein the fastener shank is recessed or apertured along the axis thereof.

A still further object of the invention is to provide a fastener element substantially of the above type wherein there are provided a plurality of annularly arranged shoulders with the recess or aperture in the fastener disposed at least in the region of the shoulders to facilitate collapsing of the shank during insertion.

A still further object of the invention is to provide a fastener substantially of the above type wherein the projections or shoulders are integral with the shank and which projections or shoulders operate to effect collapse of the shank along the major axis thereof.

The above and other objects of the invention will in part be obvious and will be hereinafter more fully pointed out.

In the drawings:

Fig. 1 is a perspective view showing one type of fastener embodying the principles of the present invention;

Fig. 2 is a longitudinal section of the fastener shown in Fig. 1;

Fig. 3 is a transverse section taken substantially along the line 3—3 of Fig. 1 and illustrating, perhaps in a somewhat exaggerated manner, the major and minor axes of the fastener shank;

Fig. 4 is a fragmentary cross sectional view showing the fastener of Fig. 1 applied to a structure such as the fire wall of an automobile;

Fig. 5 is a longitudinal section, similar to Fig. 2, but showing a modified form of fastener mounted in a work structure similar to that of Fig. 4;

Fig. 6 is a transverse section, similar to Fig. 3, showing a further modified form of fastener shank in which the bore therein is out-of-round to present major and minor axes.

Referring more in detail to the accompanying drawing, and particularly to Figs. 1 through 4, there is shown a one piece fastener element having a head portion 10 and a shank portion 12. The shank portion is illustrated as being bored or recessed substantially throughout its length and through the head to provide the internal bore or recess 14. However, the entering end or tip 16 of the shank is closed and imperforate and tapered inwardly from the shank to form a generally pointed extremity facilitating the passage of the fastener element through the panels and the intermediate layer of insulating material.

At least a portion of the exterior surface of the shank is provided with outward projections or shoulders 18 which are integral with the plastic material forming the fastener element and of relatively short radial extent. These projections or shoulders are illustrated as extending circumferentially around the shank but it is to be clearly undrstood that these projections or shoulders might be circumferentially interrupted to provide spaced shoulder means around the shank.

As particularly shown in Fig. 3, the shank 12 is out-of-round and is illustrated as having a major axis designated by the line a—a and a minor axis designated by the line b—b. In this form, the shank is generally elliptical but it is to be understood that other shapes employing major and minor axes may be employed for the purposes intended. The bore 14 may be either circular or its internal surface may symmetrically follow the out-of-round external surface of the shank and included shoulders 18.

Referring to Fig. 4, the fastener element of Fig. 1 is shown inserted in a work structure which includes an outer apertured panel 20 and an inner apertured panel 22 spaced a predetermined distance therefrom and with the intervening space filled or otherwise packed with an insulating material 24. When this fastener element is inserted through the apertures in the panels 20, 22, the surface of the shank along the major axis a—a will be progressively collapsed so as to conveniently pass through the apertures. The annular shoulders 18 are integral with the material of the shank and have little tendency to themselves flex so that the shank is in effect collapsed along the major axis under the influence of the shoulder surfaces engaging the defining walls of the apertures in the panels. During the collapsing of the shank along the major axis, compensation is afforded by perhaps a slight expansion of the shank along the minor axis. With a circular shank, a more exact selection of fastener for a particular size hole would be necessary and the requisite oversize selection of such a circular shank would render insertion difficult. With the out-of-round shank of this form of fastener, it will accommodate itself to openings of different sizes. Further, where the shoulders are completely annular, the collapsing of the major axis of the shank in certain hole sizes will effect a secondary seal around the aperture in the inner panel 22, the clamping surface 11 of the head 10 serving to seal the aperture in the outer panel 20.

In Fig. 5 there is shown a modified form of fastener mounted in a similar work structure including an apertured outer panel 20a and an inner apertured panel 22a with insulation 24a or the like disposed between the inner surfaces thereof. This form of fastener is generally similar to that described above in connection with Figs. 1 through 4 but the shank 12a, at a predetermined distance from the clamping surface of the head 10a, is provided with an outward shoulder 26 of slightly larger diameter than the shoulder means 18a and facing in opposition to the next adjacent shoulder 18a. With this construction, the shoulder 26 operates to engage the inner surface of the inner panel 22a in opposition to engagement of the outer surface of this panel by the next adjacent shoulder 18a, thus providing a further positive spacing of the two panels 20a, 22a. In this form of the invention, the shank may also be formed out-of-round in the manner pointed out above, or also in the manner to be pointed out hereinafter.

In Fig. 6, there is shown a transverse section of a fastener similar to that shown in Fig. 3. In this form of the invention, the outer surface of the shank and the included shoulders or projections may be substantially circular. To facilitate collapsing of the shank during insertion through the apertured work panels, the central bore 14b is out-of-round to present, in cross section, an inner surface having a major axis $a'a'$ and minor axis $b'b'$. With this form of fastener, the material of the shank along the areas 38, 38a is of somewhat reduced cross section as compared with the material of the shank along the major axis. The areas 38, 38a thus provide relatively weakened areas which facilitate collapse of the shank during insertion through the work structure.

From the foregoing description, it will be seen that the present invention provides a fastener having a shank portion presenting a cross sectional surface which is out-of-round, such as elliptical, to present major and minor axes which greatly facilitate the collapsing thereof during passage through apertured work panels but by reason of the inherent resiliency of the shank, it will spring outwardly after passage through the work structure so that the shoulder means thereof will engage one surface of a work panel in opposition to the surface of another work panel engaged by the clamping surface of the head. The shoulders are integral with the shank and project only slightly from the periphery thereof. Being integrally attached through their extents, the shoulders or projections, unlike struck out retaining sections of metal fasteners, have little tendency to themselves flex but rather the shank is caused to progressively collapse under influence of the shoulders as they are progressively passed through the apertures in the work panels. The recessing of the shank may be in the nature of a central bore, as suggested in Figs. 1 through 5. In each instance, the shank presents, in cross section, an out-of-round or elliptical shape having major and minor axes, the material along the major axis being collapsed during insertion through the work structure. Likewise, in Fig. 6, the shank presents an internal surface which is out-of-round to present major and minor axes and during insertion of this type of fastener, the material along the major axis is of somewhat reduced cross section to facilitate collapse of the shank therealong during its insertion through the work structure.

While certain forms of the invention have been shown and described for purposes of illustration, it is to be clearly understood that various changes in details of construction and arrangement of parts may be made without departing from the spirit and scope of the invention as set forth in the appended claims.

I claim:

1. A one-piece plastic drive fastener adapted for use in securing together spaced apertured panels of a work structure; and comprising a head having a clamping surface for engaging one surface of the work structure and providing a driving head, an elongated substantially axially rigid shank extending axially from said head clamping surface and adapted to be driven through the work structure, said shank including a plurality of axially spaced shoulder means integral with and projecting outwardly therefrom, each of said shoulder means being substantially solid with little tendency to yield relative to the shank section and having a substantially radial surface extending from the periphery of the shank and facing the head clamping surface, said shank having an imperforate elongated tapering free end portion having a length greater than its diameter for facilitating driving of the shank through the work structure, said shank enclosing a recess at least axially traversing the region of said shoulder means to lend radial resiliency to the shank section in that region, said shank section presenting a transverse cross section through the recess and in the region of the shoulder means with inner and outer surfaces, one of said surfaces being substantially elliptical to present major and minor axes and the other of said surfaces being substantially circular to afford wall portions of reduced thickness extending longitudinally of the shank section facilitating resilient collapse of the shank section under influence of the shoulder means along the reduced wall portions of the shank section during insertion thereof through the apertured work panels and with the shank section thereafter expanding beyond the work structure to position a radial surface of an adjacent shoulder means for engaging another surface of the work structure in opposition to the clamping surface of the head.

2. A one-piece plastic drive fastener as claimed in claim 1, wherein the outer surface of the shank section is substantially elliptical.

3. A one-piece plastic drive fastener as claimed in claim 2, wherein the shoulder means is annularly disposed around the substantially elliptical shank section to present substantially elliptical outer edges facilitating adaptation of the shoulder means along the major axis of the shank section to variously sized panel apertures.

4. A one-piece plastic drive fastener as claimed in claim 1, wherein the inner surface of the shank section is substantially elliptical.

5. A one-piece plastic drive fastener as claimed in claim 4, wherein the shoulder means is annularly disposed around the outer surface of the shank section.

6. A one-piece plastic drive fastener as claimed in claim 1, wherein the shank is provided with an outward shoulder adjacent the shank section and facing in the direction of the free end portion in opposition to said shoulder means and of greater radial extent than said shoulder means to trap a work panel therebetween.

7. A one-piece plastic drive fastener as claimed in claim 1, wherein the shoulder means is disposed at least along the major axis surface of the shank section.

References Cited in the file of this patent
UNITED STATES PATENTS

| 204,913 | Pratt | June 18, 1878 |
| 908,876 | Monaghan | Jan. 5, 1909 |
| 1,915,249 | Jorgensen | June 20, 1933 |
| 2,420,826 | Irrgang | May 20, 1947 |
| 2,560,961 | Knohl | July 17, 1951 |
| 2,709,290 | Rosenthal | May 31, 1955 |